United States Patent [19]

Schwarz et al.

[11] Patent Number: 4,907,869
[45] Date of Patent: Mar. 13, 1990

[54] TILTABLE OUTSIDE REARVIEW MIRROR FOR A VEHICLE

[75] Inventors: Christoph Schwarz, Freudenberg; Herwig W. Polzer, Miltenberg, both of Fed. Rep. of Germany

[73] Assignee: Hohe KG, Collenberg, Fed. Rep. of Germany

[21] Appl. No.: 336,123

[22] Filed: Apr. 11, 1989

[30] Foreign Application Priority Data

Apr. 12, 1988 [DE] Fed. Rep. of Germany ... 8804802[U]

[51] Int. Cl.⁴ .............................................. G02B 5/08
[52] U.S. Cl. ................................. 350/604; 350/632; 248/478; 248/549
[58] Field of Search ............... 350/604, 605, 632, 633, 350/634, 636; 248/467, 477, 478, 481, 485, 487, 548, 549

[56] References Cited

U.S. PATENT DOCUMENTS 4,740,066 4/1988 Whitehead ......................... 350/631

FOREIGN PATENT DOCUMENTS 3032392 8/1980 Fed. Rep. of Germany .
3220893 6/1982 Fed. Rep. of Germany .

Primary Examiner—Bruce Y. Arnold
Assistant Examiner—J. Patrick Ryan
Attorney, Agent, or Firm—Fleit, Jacobson, Cohn, Price, Holman & Stern

[57] ABSTRACT

To reliably reduce the risk of injury in the returning tilting movement of the mirror housing from a rearward tilted end position into a position of normal use a spherical cap is mounted to a pedestal for the mirror housing which covers the open space between a front edge section of the mirror housing and the pedestal when the mirror housing is tilting rearwardly. Stops are provided for ensuring safe support of the mirror housing when assuming the rearward tilted end position thereof. The stops can be removed only by an application of force to the mirror housing whereafter the mirror housing tilts from said rearward tilting end position into the position of normal use.

13 Claims, 5 Drawing Sheets

TILTABLE OUTSIDE REARVIEW MIRROR FOR A VEHICLE

CROSS-REFERENCES TO RELATED APPLICATIONS

The invention is related to U.S. patent application Ser. No. 07/239,384 of Herwig Polzer, Richard Seubert and Hans J. Fuchs

BACKGROUND OF THE INVENTION

The invention refers to an outside rear-view mirror for a vehicle.

German Offenlegungsschrift No. 32 20 893 discloses an outside rearview mirror having a pedestal and a mirror housing wherein a mirror glass is mounted as known in the art. The mirror housing is mounted to the pedestal such that it may rock rearwardly i.e. opposite to the direction the car is normally driven, towards the car body to which the pedestal is fastened. The rearward rocking movement of the mirror housing terminates in an end positon of the mirror housing wherein the front portion of the mirror housing rim is supported by a recessed free end of an arm which is pivotably mounted to the pedestal and is urged forwardly by a spring. When the driver of the car intends to run the car through a narrow passage he may rock the mirror housing projecting outwardly from the car body into said end position. The car may then pass through a passage having smaller width.

After having passed said passage the driver may wish to transfer the mirror housing into the positon of normal use thereof relative to the pedestal. To this end the driver has to urge the arm rearwardly in order to release the mirror housing. Thereby a security risk is encountered because the fingers of the driver may be clamped between the pedestal and the rim of the mirror housing which returns to its normal position of use under the influence of a strong tension spring.

For reducing the risk of injury during return tilting of the mirror housing from a tilted end positon into a positon for normal use, U.S. patent application Ser. No. 07/239,384 discloses a mirror housing which swings against an overcomeable stop defining a tilted end position. For returning the mirror housing into the position of normal use only a certain force has to be applied on the mirror housing which releases it from the stop and allows it to tilt into the position for normal use. Thus, the driver needs no longer manipulate with his fingers in the space between the tilted mirror housing and the pedestal.

Nevertheless, in this outside rearview mirror a space remains between the tilted mirror housing and the pedestal which is freely accessible and therefore creates a certain safety problem i.e., in the event of manipulations for maintenance or repair which are carried out in trusting that the mirror housing is safely held in the tilting end position thereof by the catch mechanism. Moreover, foreign matter or water from wash-mobils may enter into the interior of the mirror housing when the mirror housing is titled to the car body.

German Offenlegungsschrift No. 30 32 392 discloses a tiltable outside rear-view-mirror for a vehicle wherein an elastic sheath is fastened to the forward section of the mirror housing and the pedestal which covers the space between the mirror housing and the pedestal when the mirror housing has assumed a tilted position. Such sheath is usually made from bellows of elastic material and is therefore very expensive because special provisions have to be made for its permanent mounting to the pedestal and the mirror housing. Moreover, such elastic material ages and becomes brittle and crackled under the influence of normal driving conditions. Additionally, it is more difficult to clean the comparatively soft material of the sheath than the mirror housing which commonly is formed from hard plastics.

SUMMARY OF THE INVENTION

It is therefore an object of the invention to devise an improved outside rearview mirror for a vehicle. Specifically, it is intended to devise a rearview mirror for a vehicle, which creates no risk of injuries when the mirror housing is tilting rearwardly towards the car body. Yet another object of the invention resides in devising an outside rearview mirror which withstands all severe environmental conditions over a long time of use.

To this end the invention provides an outside rearview mirror for a vehicle having a pedestal adapted to be mounted to the car body and having a mirror housing which is held to the pedestal in a position of normal use by a spring. An edge of the mirror housing abuts a shoulder of the pedestal. The mirror housing may be titled rearwardly about its rearward edge section relative to the pedestal against the force of the spring. A spherical cap is mounted to the pedestal which is covered by the mirror housing in the position of normal use thereof. The curvature of the cap has a center in the rearward edge section. The front edge section of the mirror housing rides upon the periphery of the cap when the mirror housing is tilting rearwardly. Thus, when the mirror housing assumes its position of normal use the cap is withdrawn from atmospheric interferences and has no adverse effect on the design of the outside rearview mirror. Moreover, the cap may be formed as a simple injection moulded part. During tilting of the mirror housing the cap covers the open space between the mirror housing and the pedestal.

According to an embodiment of the inventon which refers to a mirror housing adapted to tilt forwardly relative to the pedestal, the cap is pivotably mounted to a front shoulder section of the pedestal and is forced against the mirror housing by a spring coupled between the cap and the pedestal. Thereby the cap may be pivoted during forward tilting of the mirror housing by a tension spring urging the mirror housing into its position of normal use.

In a further improvement of the invention, a catch may be formed on the cap which grasps releasably the mirror housing when it assumes a rearward tilting end position. The catch may be integrally formed from the cap as a nose projecting from the outer periphery of the cap for grasping the front edge section of the mirror housing in the rearward tilting end position. The mirror housing may be released from the rearward tilting end position by application of a light force on the outer portions of the mirror housing by the driver which causes automatic return of the mirror housing into the position of normal use thereof under the force developed by the tension spring.

The catch may be formed in a number of embodiments. Thus, the catch may be a bar abuting below a shoulder of the mirror housing, the bar being mounted below the cap and projecting slightly over the cap trough an opening thereof. Preferably, the bar may, against the force of its spring, escape rearwardly for easing the rearward tilting movement of the mirror housing.

According to another preferred embodiment of the invention a stop element is provided at a rocker which is held in a respective one of two rocking positions by a spring. In the first rocking position a stop nose provided on the rocker or the mirror housing falls into a trap when the mirror housing assumes the tilted end positon and thereby holds safely the tilted mirror housing in said position. For releasing the mirror housing it is further tilted towards the car body for a short distance whereby the rocker is transferred into its second rocking positon for allowing the stop nose to escape from the trap so that the mirror housing may return to the position of normal use under the influence of the tension spring. During return of the mirror housing the rocker is retransferred into its first rocking positon for being prepared to again hold the mirror housing when it will assume the rearward tilting end positon.

BRIEF DESCRIPTION OF THE DRAWING

Preferred embodiments of the invention are explained herein after with reference to the attached drawings.

For explaining the technical background of the invention FIG. 1 illustrates an outside rearview mirror of known construction. A pedestal 2 is mounted in a kind not shown to a car body 1 illustrated schematically by a dashed line. The pedestal has opposite to the car body 1 a support plate 4 which is surrounded by an outwardly protruding shoulder 3. A mirror housing 5 has a spherically formed edge 18 adjacent to the pedestal 2. FIG. 1 shows only the front edge section 6 and the rearward edge section 8 of said edge 18. The designations "forward" and "rearward" refer to the direction of traffic identified by the arrow 10. The edge sections 6, 8 surround the support plate 4 and abut corresponding sections of the shoulder 3 when the mirror housing 5 assumes a position of normal use according to FIG. 1.

Figure 1:
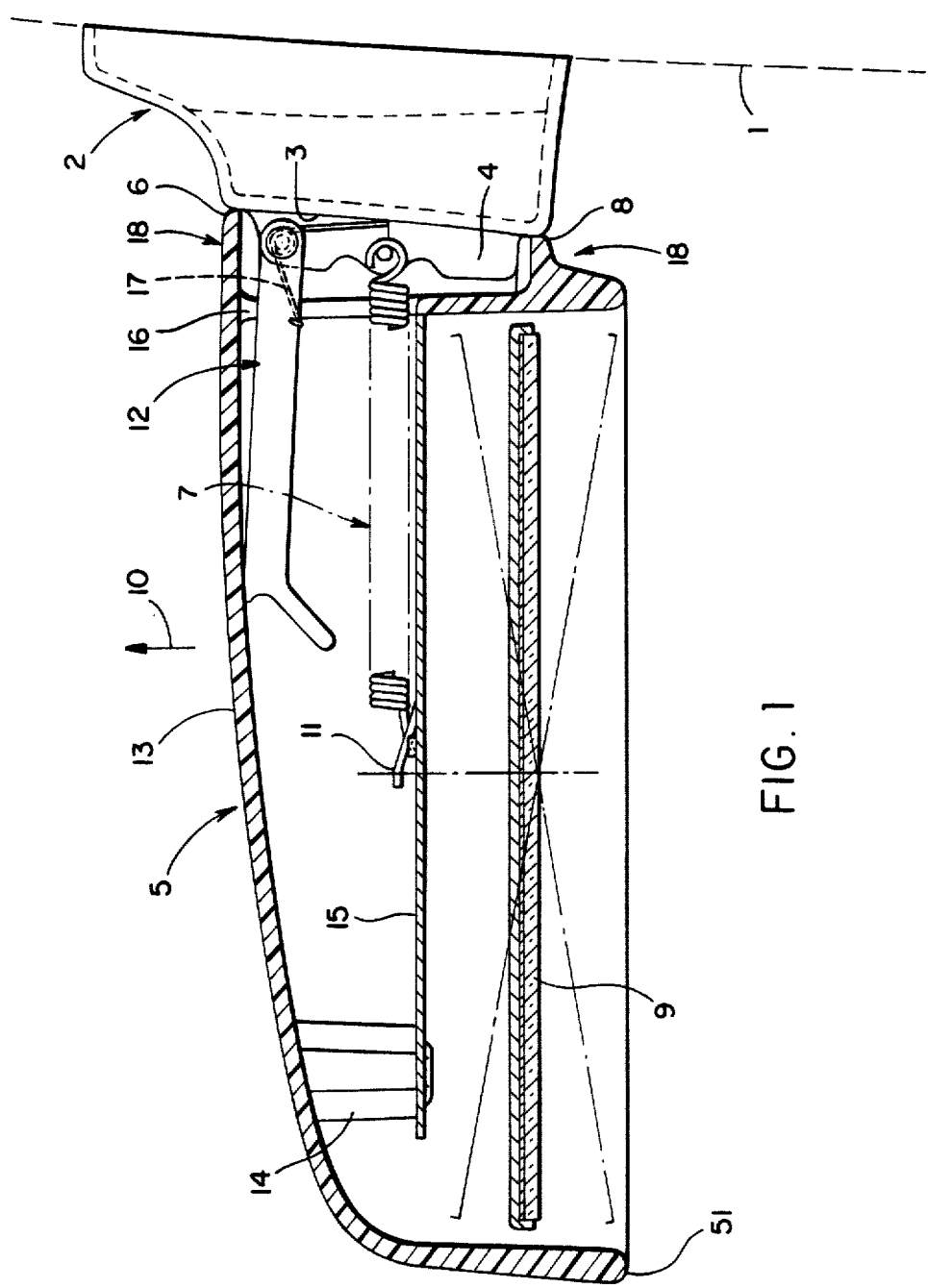
FIG. 1 shows a horizontal cross section through a mirror housing and a pedestal mounted to a car body.

One end of the strong tension spring 7 is anchored on the support plate 4 and the opposite end thereof is accomodated within the mirror housing 5 and is hung into an ear 11 of a baring plate 15. The baring plate 15 is mounted to the front wall 13 of the mirror housing 5 through posts. Post 14 arranged away from the pedestal 2 is shown in FIG. 1. A mirror glass 9 is mounted to the baring plate 15 in known manner not shown and may be adjusted as to its position by not shown operating members extending through the pedestal 2 and through an opening 16 in the mirror housing 5.

For further details and the functional features of the tilting movement of the mirror housing 5 relative to the pedestal 2 reference is made to German Offenlegungsschrift No. 32 20 893 the disclosure of which is incorporated herein.

Figure 2:
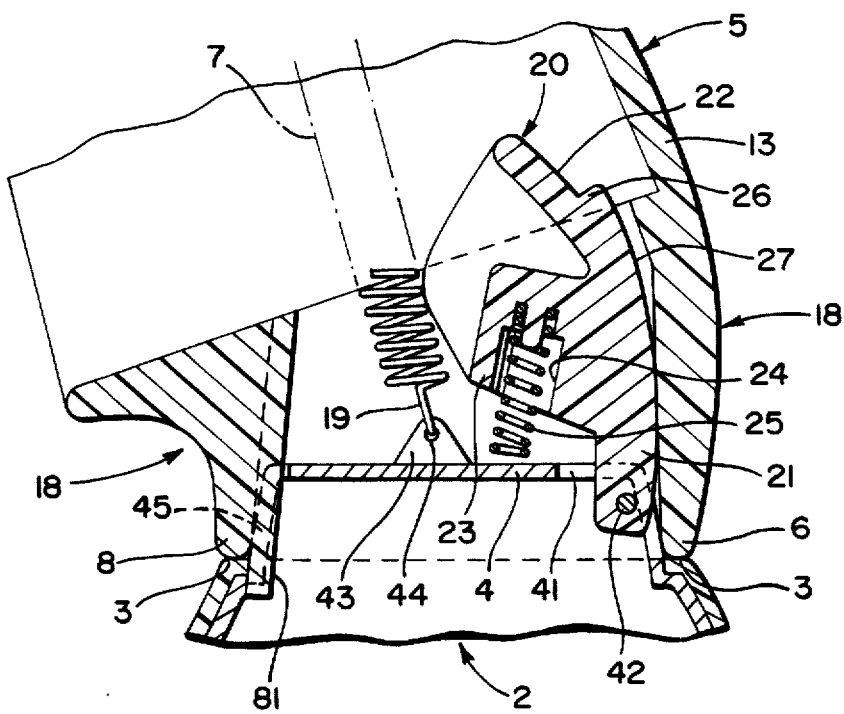
FIG. 2 shows a cross section through a portion of the mirror housing with a cap close to the pedestal, in the position of normal use.
Figure 3:
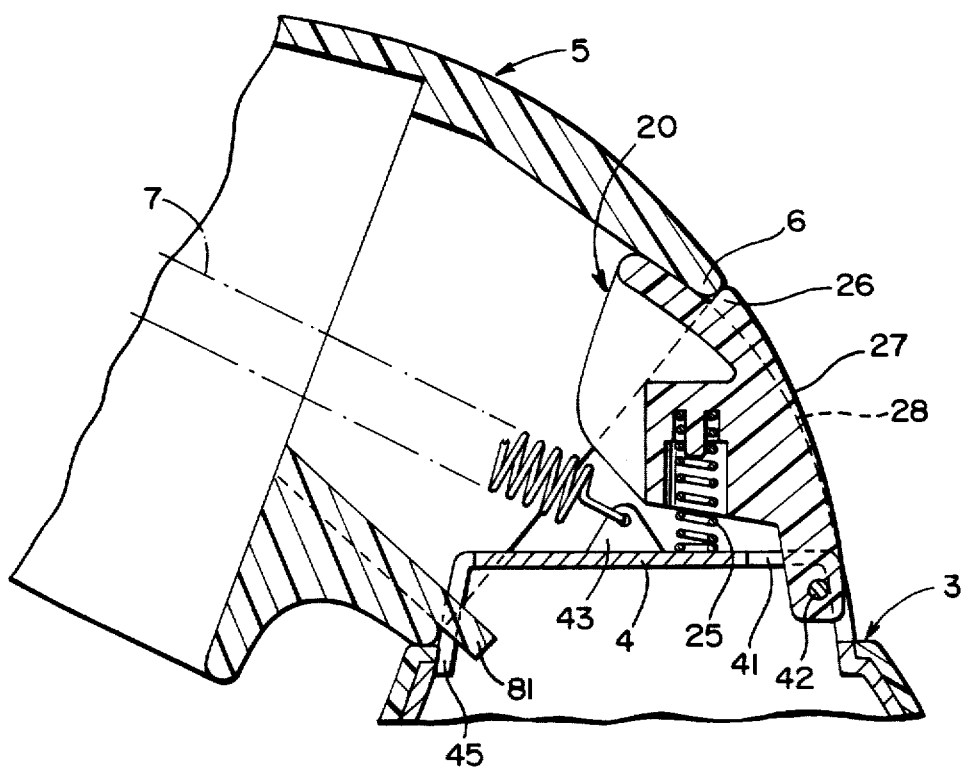
FIG. 3 shows a cross section through a portion of the mirror housing with a cap close to the pedestal when assuming the rearward tilting end position.
Figure 4:
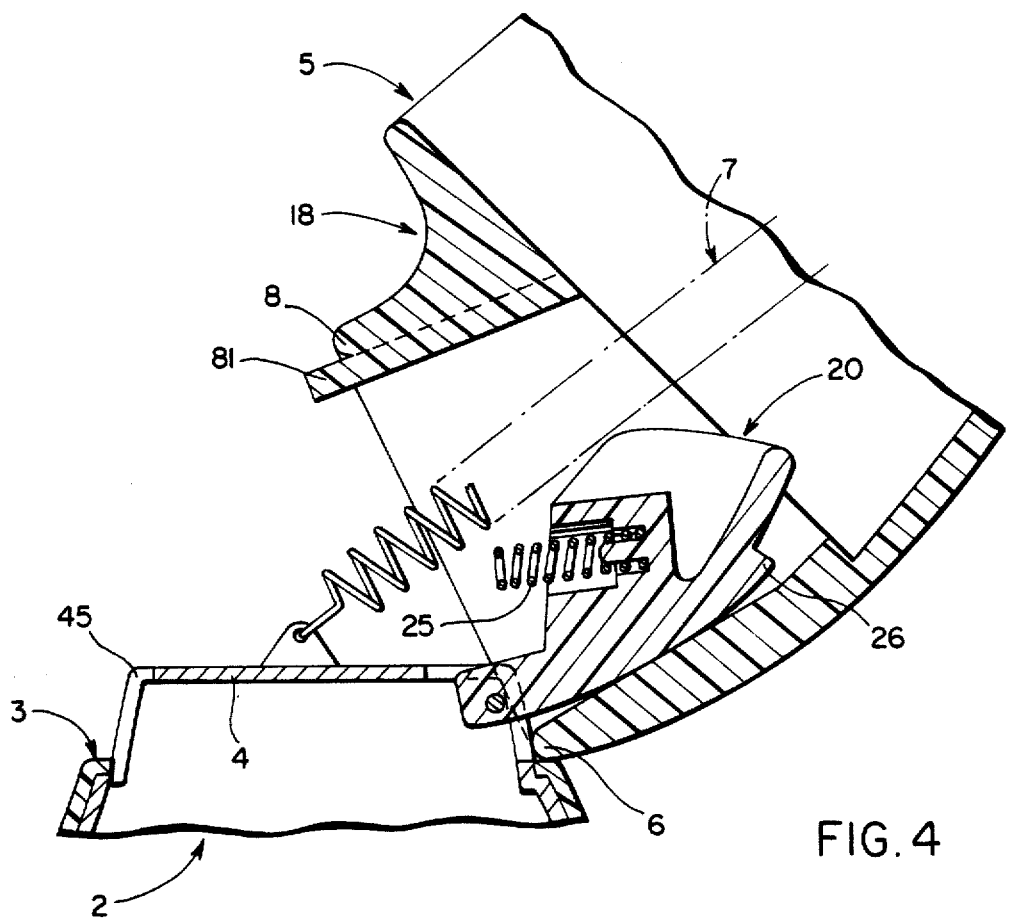
FIG. 4 shows a cross section through a portion of the mirror housing close to the pedestal when assuming the forward tilting end positon.

A first embodiment of the invention is shown in FIG. 2 through 4 and includes a cap 20 which is mounted to the support plate 4 of the pedestal 2 within an area of the rim 18 which is close to the front edge section 6. To this end the support plate 4 is provided with an outcut 41 into which a lower end 21 of cap 20 projects and wherein said lower end 21 is mounted to a pin 42 so as to be pivotable about an axis which is perpendicular to the plane of FIG. 2 i.e. which runs vertically when the outside rearview mirror is mounted to the car body. The cap 20 which is formed as a one piece part from the same plastic material as the mirror housing 5 has an articulated spherical form the curvature of which is centered to the rearward edge section 8. The form in detail of the shell-like cap 20 is determined by the contour of rim 18 such that the outer contour of cap 20 is defined by the path along which the front edge section 6 runs when the mirror housing 5 tilts rearwardly.

The cap 20 has a central thickened portion 23 including a pocket 24 for receiving and holding a pressure spring 25. The pressure spring 25 accomodated within the pocket 24 has a protruding free end which may abut the surface of the support plate 4 of the pedestal 2.

A nose 26 projects from the outer contour 22 of cap 20 in the vicinity of the outward end thereof, the function of which will be explained herein after.

According to FIG. 2 trough 4 a post 43 extends upwardly towards the mirror housing 5 approximately in the middle of support plate 4 and is provided with an eye 44. The end 19 of tension spring 7 adjacent the pedestal is hung into the eye 44.

From the rearward edge section 8 a pin-like extension 81 is formed which dips into a rearward outcut 45 of the rearward sidewall of support plate 4.

According to FIG. 2 which shows a portion of the mirror housing 5 in a position for normal use the module comprising cap 20 and pressure spring 25 is completely covered by rim 18 of mirror housing 5 and therefore cannot be seen from the exterior of the outside rearview mirror. When the mirror housing 5 tilts rearwardly about an axis defined substantially by abutment of the rearward edge section to the rearward portion of shoulder 3 the front edge section 6 slides along a first portion 27 of the outer contour 22 which portion 27 has the form a rib with respect to the surrounding portion 28 of the outer contour, the thickness of the rib increasing when proceeding to nose 26. When the edge section 6 slides along said first portion 27 the cap 20 is forced to turn about the pin 42 towards the support plate 4 against the influence of the pressure spring 25 because of the engagement thereof with the support plate 4. When the rearward tilting movement proceeds the front edge section 6 passes nose 26 and thereafter cap 20 snaps forwardly so that the upper portion 29 of its outer contour 22 abuts the inner surface of rim 18. Simultaneously the extension 81 penetrates into outcut 45 of pedestal 2 so that the mirror housing 5 cannot be displaced downwardly or upwardly relative to pedestal 2. The mirror housing 5 may return towards the position of normal use under the influence of tension spring 7 only until it assumes its rearward tilting end position defined by abutment of the front edge section 6 to nose 26. Mirror housing 5 may be released from this steady rearward tilting end position by application of a force for instance by hand on the outer portion 51 thereof such that the front edge section 6 is lifted outwardly over nose 26 which needs sufficient space of the outcut 45. Thereafter mirror housing 5 returns automatically to the position of normal use under action of the tension spring 7 according to FIG. 2.

It may be seen that the space or the opening which is created between the front edge section 6 and the support plate 4 of the pedestal 2 when the mirror housing tilts rearwardly is almost completey covered by cap 20. Cap 20 may extend laterally as desired which extension may be selected such that said opening remains completey closed to the exterior until the mirror housing 5 reaches its rearward tilting end position.

When the mirror housing 5 tilts forwardly the rearward edge section 8 with the extension 81 lifts from the rearward portion of shoulder 3 according to FIG. 4 whereas the front edge section rolls upon the front portion of shoulder 3. During forward tilting cap 20 will be swung forwardly by tension spring 7 without imparting the tilting movement of the tension spring and of the operating members for mirror 9.

Figure 5:
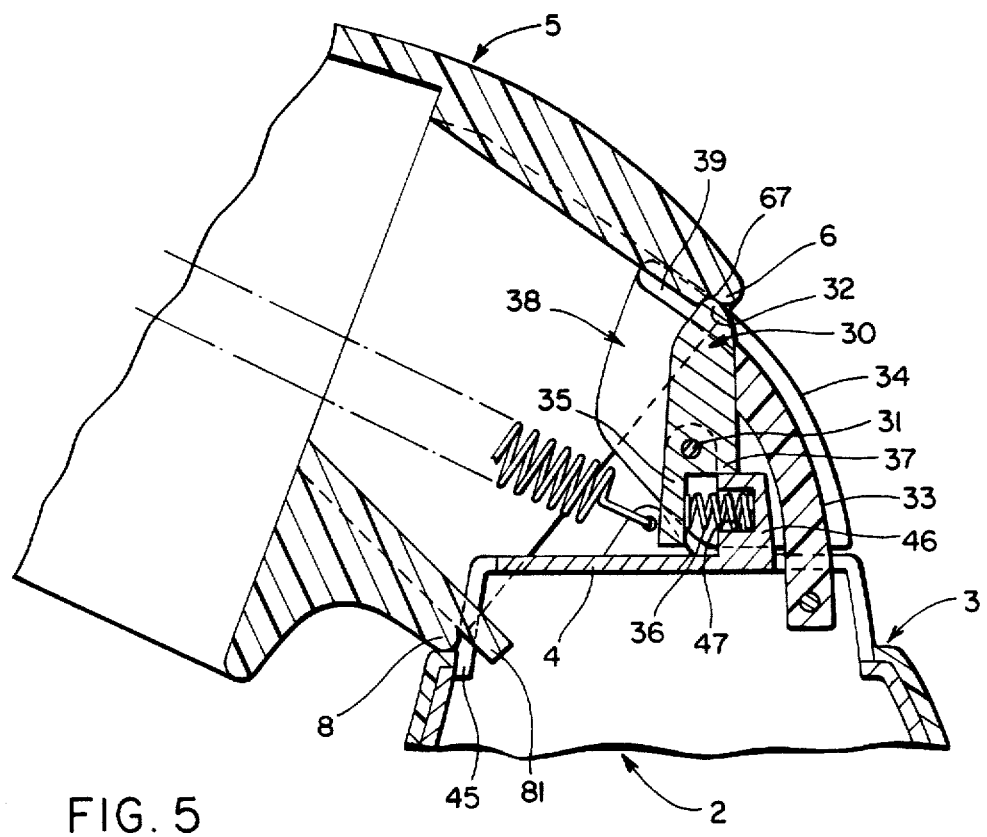
FIG. 5 is similar to FIG. 3 and shows a second embodiment of a catch member
Figure 6:
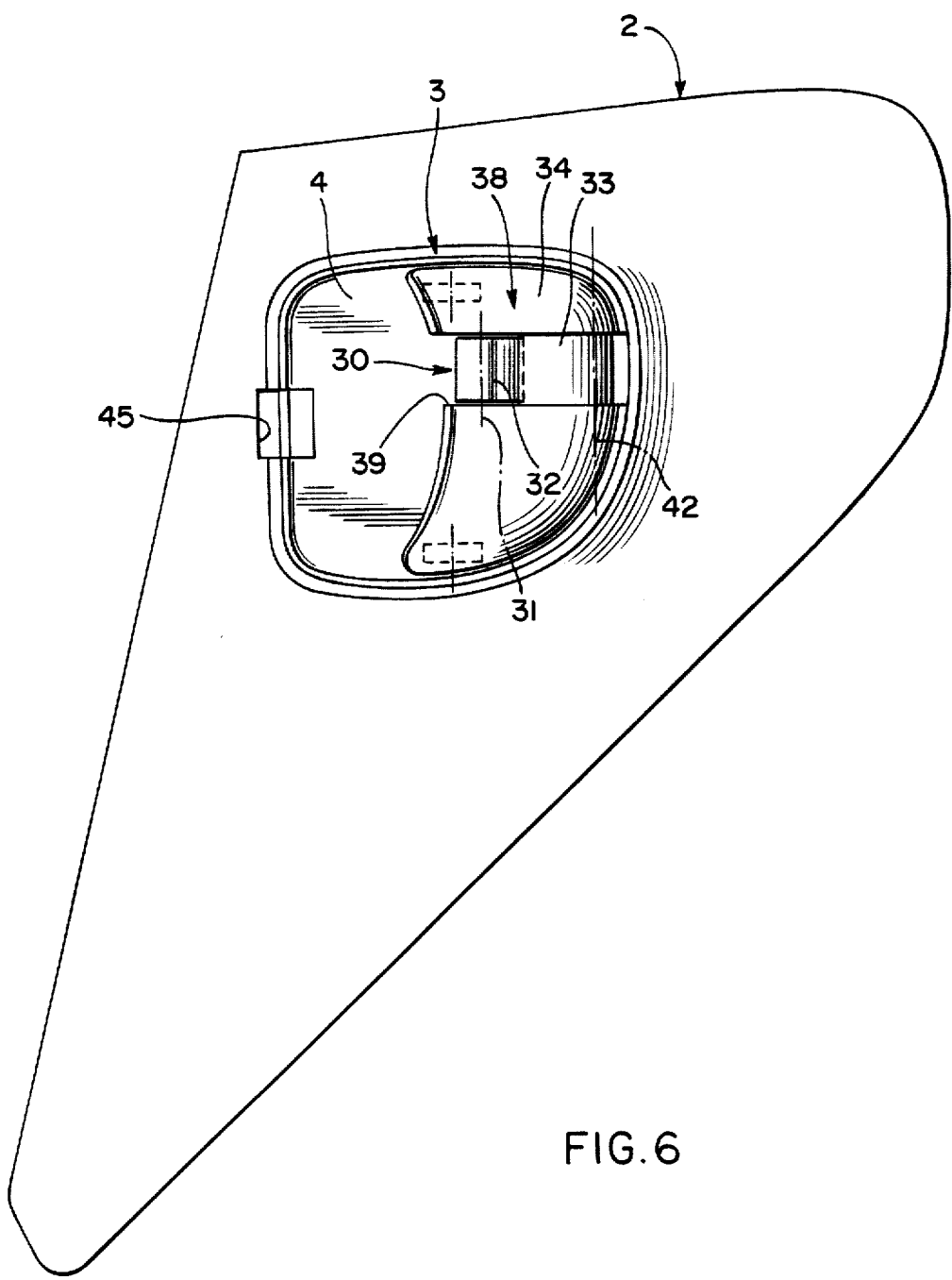
FIG. 6 shows a plan view on the pedestal with cap and the catch according to FIG. 5 after removal of the mirror housing.

The second embodiment of the invention as shown in FIG. 5 and 6 deviates from the first embodiment therein that a separate bar 30 is provided instead of nose 26 which is mounted to a shaft 31 extending substantially parallel to pin 42. Bar 30 narrows upwardly to a ridge 32 which extends into a outcut 39 of the outer contour 34. Opposite to the ridge 32 the bar 30 has a skirt 35 extending towards the support plate 4. A stand 46 extending above the support plate 4 has a recess 47 facing skirt 35. The recess 47 accommodates a pressure spring 36 which abuts the ground of the recess 47 on one end and the skirt 35 on the other end. The height of the stand 46 above the support plate 4 is selected such that a shoulder 37 of the bar formed between shaft 31 and cap 38 engages the upper surface of stand 46 when bar 30 is in stopping position according to FIG. 5.

The cap 38 is provided with a slot 39 cut lengthwise from its upper edge. In the direction of the slot 39 a channel 33 is formed in the outer contour 34 of cap 38. Apart therefrom cap 38 is similar to cap 20 according to the first embodiment of the invention.

The mirror housing 5 is provided with an inwardly extending shoulder 61 formed at the front edge section 6. Shoulder 61 is accommodated within the channel 31 when the mirror housing 5 tilts rearwardly and rests upon the ridge 32 of bar 30 when the mirror housing assumes its rearward tilting end position.

When the mirror housing 5 assumes its position of normal use the inner surface of rim 18 urges bar 30 rearwardly against the force of spring 36 so that ridge 32 abuts that inner surface. When the mirror housing 5 tilts rearwardly to a sufficient extent the shoulder 61 emerges the channel 33 for passing along the slot 39. Ridge 32 rides along the rest of the inner surface of rim 18 until it may fall behind shoulder 61 under the action of spring 36. When this occurs the mirror housing 5 cannot not return towards its position of normal use but assumes its rearward tilting end position. The mirror housing 5 may surmount the stop formed by abutment of ridge 32 against shoulder 61 only upon application of a slight impact on its outer portion 51 such that shoulder 61 is lifted over ridge 32 so that shoulder 61 may find its way into channel 33.

Figure 7:
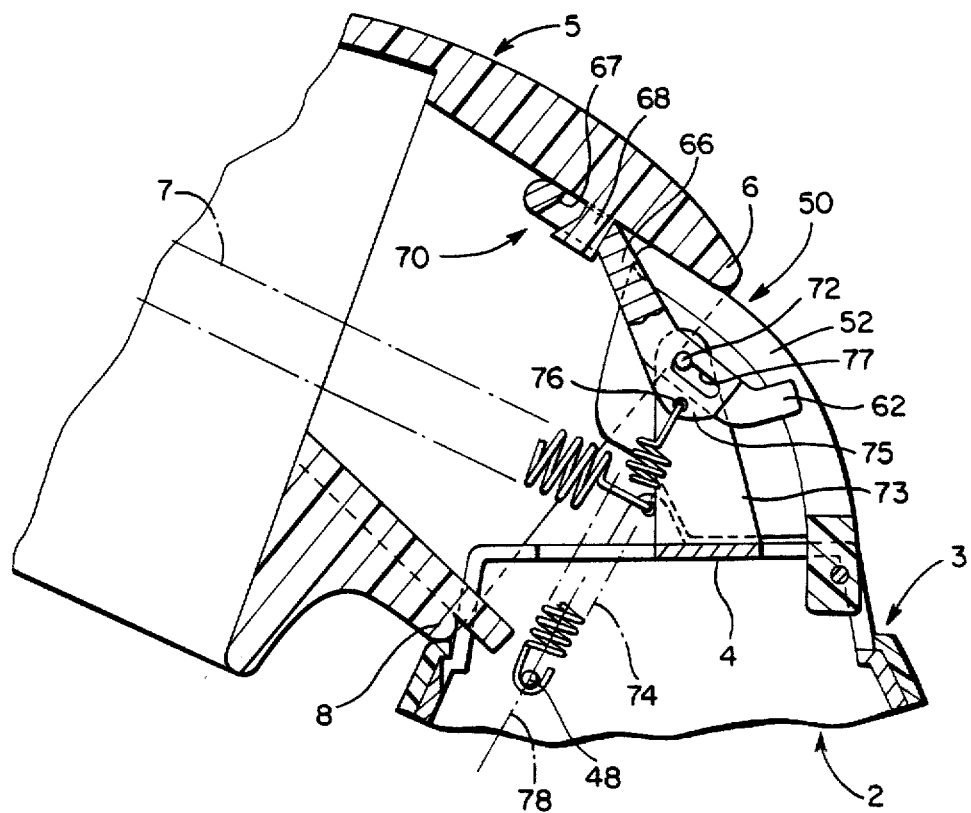
FIG. 7 is similar to FIG. 3 and shows a third embodiment.

In a third embodiment of the invention according to FIG. 7 the cap 50 is substantially similar to cap 20, but the channel 33 is extended to an elongated slot 52. A stop element is formed in the third embodiment of the invention as a rocker 70 which is rockably mounted on a shaft 72. The shaft 72 is supported in posts 73 which project from the support plate 4 towards the mirror housing 5 behind cap 50. A helical spring 74 is anchored on one end by a pin 48 mounted to the pedestal 2 and is hung on the other end into a hole 76 drilled into an intermediate portion 75 of rocker 70. Rocker 70, in the intermediate portion 75, has a transverse slot 77 for catching shaft 72. The transverse slot 77 extends transversly to the line 78 along which spring 74 developes a pulling force, as will be described herein after in detail.

The rocker 70 comprises a first arm 66 having a break trough 67 in the vicinity of the free end thereof. The break through 67 serves as a catch or trap for a stop nose 68 projecting from the inner surface of the front edge section 6 of mirror housing 5. The rocker 70 comprises a second arm 62 which is opposite to the first arm 66 with respect to the intermediate portion 75 and which may dip into the elongated slot 52 by its free end.

FIG. 7 shows the mirror housing 5 in its rearward tilting end position wherein the stop nose 68 extends into trap 67, and wherein the mirror housing 5 is supported by shaft 72 through abutment of the stop nose 68 against first arm 66 and abutment of shaft 72 against an end of transverse slot 77. Thus, the mirror housing 5 is held safely when assuming the rearward tilting end position. The line 78 along which the spring 74 developes a pulling force passes, as shown in FIG. 7, right to the shaft 72 to the effect that the spring 74 loads rocker 70 by a torque in clockwise direction, whereby the first arm 66 is urged against the inner surface of the front edge section 6. For releasing the mirror housing 5 from the rearward tilting end position the mirror housing has to be tilted rearwardly beyond its rearward tilting end position. When so further tilting the stop nose 68 draws rocker 70 such that the transverse slot 77 thereof rides over shaft 72 until shaft 72 abuts the opposite end of transverse slot 77. In this structural arrangement of rocker 70 and shaft 72 line 78 passes shaft 72 on the left side thereof so that the torque developed by spring 74 causes the rocker 70 to turn counter clockwise about shaft 72. The effect is that rocker 70 pivots from the position as shown in FIG. 7 into a second, not shown, position wherein the first arm 66 may escape from stop nose 68. The mirror housing then may return towards its position of normal use under influence of the tension spring 7. During this returning movement of the mirror housing 5 the stop nose 68 would engage the second arm 62 the free end of which extends through elongated slot 52 into the path of the returning movement of the front edge section 6 and of the stop nose 68. The front edge section 6 and the stop nose 68 shaft the free arm 62 out of their returning movement path to the effect that rocker 70 is displaced with respect to shaft 72 such that shaft 72 will abut the first mentionned end of transverse slot 77. As explained above the first arm 66 of rocker then will again contact the inner surface of the front edge section 6. Consequently the rocker 70 then is prepared to function as a stopping and holding means for the mirror housing when it will assume again the rearward tilting movement end position. It is to be noted that the elongated slot 52 accommodates and guides stop nose 68 when the mirror housing 5 assumes its position of normal use and tilts rearwardly.

Figure 8:
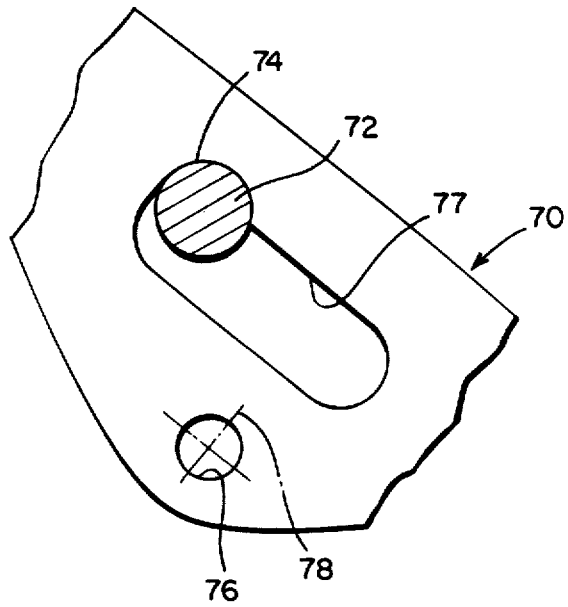
FIG. 8 shows a section from FIG. 7 in enlarged scale.

For further improving a safe stop of the mirror housing 5 in the rearward tilting end position thereof the transverse slot 67 is provided with a lateral extension at 71 according to FIG. 8 at the end thereof which is proximate to the first arm 66. In this embodiment application of some force on mirror housing 5 for further rearward tilting thereof is necessary for transferring the rocker 70 from the position relative to shaft 72 as shown in FIG. 7 to a position as mentioned above wherein the stop nose 68 may escape the trap 67. In this embodiment a situation is prevented wherein the stop nose 68 may transfer the rocker 70 to the last mentioned releasing position with respect to shaft 72 already when it engages the first arm 66 shortly before it may fall into trap 67 during rearward tilting of the mirror housing 5.

Figure 9:
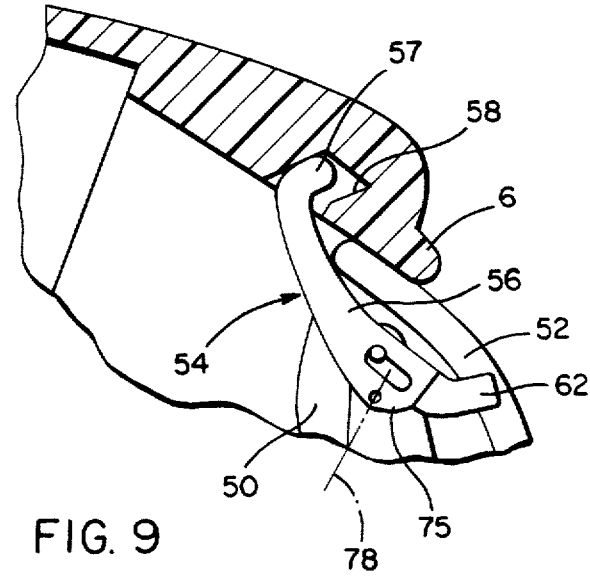
FIG. 9 shows a section from FIG. 7 in enlarged scale, however according to a different embodiment of the catch member.

In another embodiment of the invention as shown in FIG. 9 a recess 58 into the inner surface of front edge section 6 is provided for forming a catch or trap for a lateral free end 57 of a first arm 56 of rocker 54 which in all further aspects is similar to rocker 70. FIG. 9 shows the situation when the mirror housing 5 assumes its rearward tilting end positon defined by abutment of the end 57 of first rocker arm 56 against an inner surface of recess 58. The operational behaviour of rocker 54 during rearward tilting of mirror housing 5 is the same as rocker 70.

It lies within the scope the invention to form posts 46 and 43 from the associated embodiment of cap 38, 50, respectively and to anchor spring 74 on a pin 48 which is mounted to the cap. Thereby a structural module is formed comprising the cap and a locking element which may be assembled separately from the outside rearview mirror and may mounted therein as a complete component.

What is claimed is:

1. An outside rearview mirror for a vehicle comprising:
    a pedestal adapted to be mounted to a body of the vehicle,
    a mirror housing tiltably mounted to said pedestal for rearward movement relative to said pedestal out of a position of normal use,
    means for holding said mirror housing in the position of normal use at the pedestal,
    an edge of said mirror housing bearing against a shoulder of said pedestal when said mirror housing assumes the position of normal use,
    a spherical cap being mounted to the pedestal and covered by the mirror housing in the position of normal use thereof a curvature of the cap being centered to a rearward edge section of the mirror housing,
    a portion of the said edge riding on an outer periphery of said cap when the mirror housing tilts rearwardly.

2. An outside rearview mirror as claimed in claim 1, wherein said cap is pivotably mounted in the vicinity of a front shoulder section of said pedestal and is urged against said mirror housing by a spring.

3. An outside rearview mirror as claimed in claim 1, wherein the cap is pivotably mounted in the vicinity of a front shoulder section of said pedestal, and includes a skirt resilianty coupled to the pedestal.

4. An outside rearview mirror as claimed in claim 1, whrerein the cap is provided with a stop element for supporting the mirror housing in a rearward tilting end position.

5. An outside rearview mirror as claimed in claim 4, wherein said stop element is formed by a nose projecting from an outer periphery of the cap and abutting a front edge section of the mirror housing in the rearward tilting end position thereof.

6. An outside rearview mirror as claimed in claim 4 wherein said stop element includes a bar for abutting a shoulder of the mirror housing, the bar being mounted within the cap and projecting therefrom.

7. An outside rearview mirror as claimed in claim 6, wherein said bar is adapted to pivot rearwardly against a force developed by a spring, and is supported by a post when the mirror housing assumes the rearward tilting end positon.

8. An outside rearview mirror as claimed in claim 4 wherein said stop element is a rocker transferrably supported by a shaft and adapted to assume two different positions with respect to the shaft, the rocker forming a releasable stop for the mirror housing in a first position thereof and releasing said stop in the second position thereof.

9. An outside rearview mirror as claimed in claim 8 wherein said rocker is provided with an arm extending into a path of return movement of the mirror housing into the position of normal use thereof.

10. An outside rearview mirror as claimed in claim 8 wherein the rocker is coupled to a tension spring for exert a torque on the rocker in each of said positions thereof.

11. An outside rearview mirror as claimed in claim 8 wherein a stop nose is formed from a front end section of the mirror housing, and wherein a catch is formed from said rocker for accomodating the stop nose when the mirror housing assumes its rearward tilting end position.

12. An outside rearview mirror as claimed in claim 8 wherein a stop nose is formed from the rocker and wherein a recess is formed in the front egde section of the mirror housing for accommodating said stop nose when the mirror housing assumes its rearward tilting end position.

13. An outside rearview mirror as claimed in claim 1, wherein said cap is formed from substantially the same type of material as the mirror housing.

* * * * *